US011431423B2

(12) United States Patent
Lightstone et al.

(10) Patent No.: US 11,431,423 B2
(45) Date of Patent: Aug. 30, 2022

(54) METHOD AND RECEIVING TERMINAL FOR REAL-TIME ADAPTIVE ANTENNA CALIBRATION WITH TRAINING SIGNAL CANCELLATION

(71) Applicant: Telefonaktiebolaget LM Ericsson (publ), Stockholm (SE)

(72) Inventors: Leonard Lightstone, Ottawa (CA); Martin Da Silveira, Ottawa (CA); Neil McGowan, Stittsville (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/637,527

(22) PCT Filed: Sep. 25, 2017

(86) PCT No.: PCT/IB2017/055812
§ 371 (c)(1),
(2) Date: Feb. 7, 2020

(87) PCT Pub. No.: WO2019/058160
PCT Pub. Date: Mar. 28, 2019

(65) Prior Publication Data
US 2020/0220629 A1    Jul. 9, 2020

(51) Int. Cl.
*H04B 17/00* (2015.01)
*H04B 17/14* (2015.01)
(Continued)

(52) U.S. Cl.
CPC .......... *H04B 17/14* (2015.01); *H04B 7/0684* (2013.01); *H04B 17/21* (2015.01); *H04L 25/03949* (2013.01)

(58) Field of Classification Search
CPC ........ H04B 7/06; H04B 7/0684; H04B 17/12; H04B 17/14; H04B 17/21; H04L 25/03;
(Continued)

(56) References Cited

U.S. PATENT DOCUMENTS 6,157,343 A * 12/2000 Andersson ............. H01Q 3/267
                                                342/174
6,480,153 B1 * 11/2002 Jung ..................... H01Q 3/267
                                                342/368
(Continued)

FOREIGN PATENT DOCUMENTS

EP         2372930 A2     10/2011
WO       2018203104 A1    11/2018

*Primary Examiner* — Frank Duong
(74) *Attorney, Agent, or Firm* — Sage Patent Group

(57) ABSTRACT

Methods and apparatus are provided for calibrating an antenna array in a receiver. A training signal for calibrating the antenna array is injected into a data signal received on each receive path to generate combined signals on each receive path. The combined signals are equalized by respective equalizers. The coefficients of the equalizers are determined by comparing a feedback signal for each receive path with the equalized signal to estimate the impairment on each received path. The estimated impairment on each receive path is used to adapt the equalize coefficients for a respective equalizer to compensate for the impairment. After equalization, an estimate of the observed training signal on each receive path is subtracted from the equalized signal for the same receive path to generate estimates of the received data signals for demodulation and decoding.

20 Claims, 6 Drawing Sheets

(51) Int. Cl.
   *H04B 17/21*  (2015.01)
   *H04B 7/06*   (2006.01)
   *H04L 25/03*  (2006.01)

(58) Field of Classification Search
   CPC ............. H04L 25/03949; H01Q 3/267; H04W 72/044; H04W 72/0446; H04W 72/082; H04W 88/08
   See application file for complete search history.

(56) References Cited

U.S. PATENT DOCUMENTS

| | | | |
|---|---|---|---|
| 7,054,396 B2 | 5/2006 | Shan | |
| 7,145,508 B2* | 12/2006 | Kawasaki | H01Q 3/267 |
| | | | 342/368 |
| 8,311,166 B2* | 11/2012 | Kenington | H04B 17/21 |
| | | | 375/347 |
| 8,340,612 B2* | 12/2012 | Schlee | H01Q 3/267 |
| | | | 455/226.1 |
| 9,094,254 B2 | 7/2015 | Da Silveira et al. | |
| 2004/0070533 A1* | 4/2004 | Azuma | H01Q 3/26 |
| | | | 342/174 |
| 2005/0140546 A1 | 6/2005 | Park et al. | |
| 2013/0102254 A1 | 4/2013 | Cyzs et al. | |
| 2014/0133470 A1 | 5/2014 | McGowan et al. | |
| 2014/0133543 A1 | 5/2014 | Da Silveira et al. | |
| 2014/0242914 A1* | 8/2014 | Monroe | H04B 17/21 |
| | | | 455/63.4 |
| 2016/0191176 A1* | 6/2016 | O'Keeffe | H04B 17/11 |
| | | | 455/63.4 |

\* cited by examiner

METHOD AND RECEIVING TERMINAL FOR REAL-TIME ADAPTIVE ANTENNA CALIBRATION WITH TRAINING SIGNAL CANCELLATION

TECHNICAL FIELD

The present disclosure relates to adaptive antenna calibration in a receiving terminal and, more particularly, to adaptive antenna calibration with training signal cancellation.

BACKGROUND

Advanced wireless systems, particularly the later releases of Long Term Evolution (LTE) and the $5^{th}$ Generation (5G) technologies currently under development, include adaptive antenna systems (AAS) as an enabling technology in the push for improved cellular performance and capacity. One consideration unique to AAS is the need to continuously calibrate the antenna elements or sub-arrays so that digital beamforming can be reliably performed. Antenna calibration (AC) can be performed in downlink (transmit), the uplink (receive) direction, or both.

Typically, antenna calibration is performed by periodically sending a known signal pattern, referred to herein as a training signal, to the antenna. The training signal as transmitted (or received) by the antenna is detected through the use of special circuitry. The detected signal is compared with the known training signal and the antenna induced errors are determined and subsequently calibrated out. The training signal typically covers the full bandwidth of a cell, but most of the remaining details of the training signal—for example contiguity in frequency and/or time—can be designed as part of the calibration procedure itself.

The frequency with which AC is performed depends primarily on the stability of the components in the radio/antenna system as well as the variability of the environment experienced by the system. There is continuous market pressure for low cost systems which generally translates to poorer quality (i.e., less stable) components.

One problem caused by the need for the training signal to perform AC is that the training signal uses some of the same time-frequency resources intended for other data signals, such as user data transmitted on an uplink shared channel. As a result, the inclusion of the training signal can negatively impact cell performance. Of course the overall benefits of AAS are such that the net gain in cell performance outweighs the alternative. Nevertheless, there is a desire to achieve even greater improvement in cell performance with AAS.

In one approach for uplink (UL) antenna calibration, training signals are coupled into (added to) the receive path near the receive antenna. In order to achieve good calibration performance, the signal level of the training signals may need to be higher than the level of the data signals (user data and/or control signals) received over the air. The result is that, without some kind of specialized processing, the signal to interference plus noise (SINR) of the data signals are negatively impacted by the presence of the training signal to the point where the data signals cannot be decoded. To compensate for the decreased SINR due to the presence of the training signal, the modulation and coding scheme (MCS) can be modified so that the UL subframe containing the training signal may also be used for traffic. The modification of the MCS can result in significant throughput degradation. If the SINR degradation is sufficiently large, MCS reduction may not be sufficient to enable demodulation and decoding of the data signals in subframes impacted by the training signal. Furthermore, if the training signal presents an interference profile for data traffic that is not well protected by channel coding, the decoding impact can be much worse than expected based on consideration of the SINR alone.

When AC is a rare event, or if cells are only lightly loaded with traffic, it can be acceptable to steal subframes and dedicate these subframes to carry the AC training signal. In other words, user data is not transmitted in a stolen subframe. However, this approach will cause noticeable cell capacity degradation when AC actions are frequent and cell loading is high.

Other wireless standards such as Wideband Code Division Multiple Access (WCDMA) may be transmitted on the same AAS system as LTE and calibration is required for beamforming to create a full sector beam. It is desirable to do the calibration in the presence of live uplink traffic without special scheduling interaction with the digital unit.

SUMMARY

The present disclosure relates to methods and apparatus for calibrating an antenna array connected to multiple receive paths in a receiver. A training signal for calibrating the antenna array is injected into a data signal received on each receive path to generate combined signals on each receive path. The combined signals are equalized by respective equalizers. The coefficients of the equalizers are determined by comparing a feedback signal for each receive path with the equalized signal to estimate the impairment on each receive path. The estimated impairment on each receive path is used to adapt the equalizer coefficients for a respective equalizer to compensate for the impairment. After equalization, an estimate of the observed training signal on each receive path is subtracted from the equalized signal for the same receive path to generate estimates of the received data signals for demodulation and decoding.

Exemplary embodiments of the disclosure comprise methods implemented in a receiving terminal of calibrating an antenna array connected to multiple receive paths. One exemplary method comprises, for each of two or more receive paths injecting a training signal into a data signal received on the receive path to generate a combined signal; equalizing the combined signal to generate an equalized signal with reduced distortion; and subtracting an estimate of an observed training signal from the equalized signal to generate an estimate of the data signal.

Other embodiments of the disclosure comprise a receiving terminal in a wireless communication network. The receiving terminal comprises an antenna array; an interface circuit coupled to the antenna array for receiving signals over a wireless communication channel, said interface circuit comprising multiple receive paths; and a processing circuit. The processing circuit is configured to, for each of two or more receive paths inject a training signal into a data signal received on the receive path to generate a combined signal; equalize the combined signal to generate an equalized signal with reduced distortion; and subtract an estimate of an observed training signal from the equalized signal to generate an estimate of the data signal.

The methods and apparatus described herein enable injection of high power AC training signals into weaker data signals with minimal impact to user signal decodability. The methods and apparatus are particularly well suited to the injection of UL training signals for receive antenna calibration purposes when the calibration technique requires a high SINR for the training signals. Special scheduling slots where traffic is halted to do the calibration are not needed with the proposed method. It will therefore not impact system throughput.

DETAILED DESCRIPTION

Figure 1:
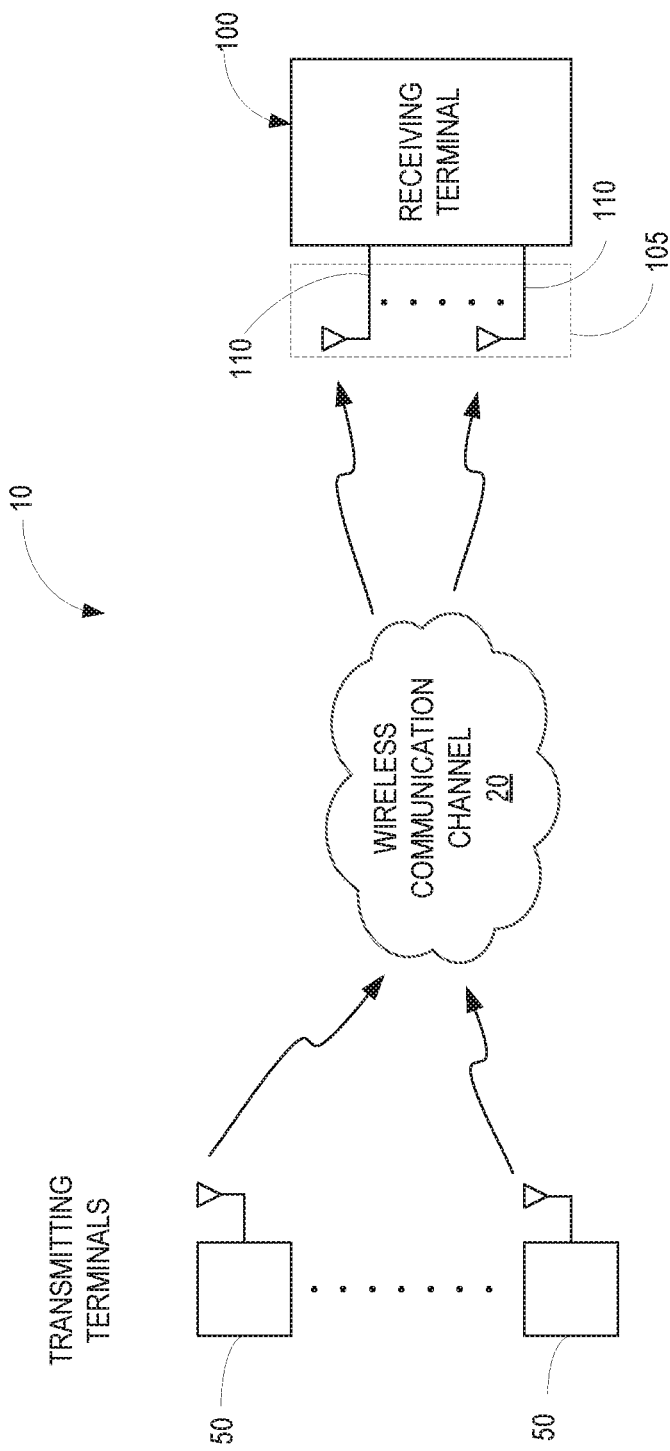
FIG. 1 illustrates communications between a transmitting terminal and a receiving terminal in a wireless communication network.

Referring now to the drawings, FIG. 1 illustrates communications over a wireless communication channel 20 between one or more transmitting terminals 50 and a receiving terminal 100 in a wireless communication network 10. The receiving terminal 100 includes an antenna array 105 comprising a plurality of antenna elements or subarrays 110 connected to multiple receive chains 125 (See, FIG. 2) for receiving signals from the transmitting terminals 50. The transmitting terminals 50 and receiving terminal 100 may operate in compliance with a wireless communication standard, such as the Global System for Mobile Communication (GSM), Code Division Multiple Access (CDMA), Wide Band Code Division Multiple Access (WCDMA), Wireless Fidelity (WiFi), LTE, 5G, or Next Radio (NR).

In the case of uplink (UL) communications, the transmitting terminals 50 typically comprise user equipment (UE) and the receiving terminal 100 comprises a radio access network (RAN) node in the wireless communication network 10. The UE functioning as a transmitting terminal 50 may comprise, for example, a cellular telephone, smart phone, laptop computer, notebook, tablet, or other wireless device capable of communicating over the wireless communication channel 20 with a RAN node (e.g. base station). The RAN node functioning as the receiving terminal 100 may, for example, comprise a base station, NodeB (NB), Evolved NodeB (eNB), 5G NodeB (gNB), access point (AP), relay, radio head, or other RAN node in the wireless communication network 10.

Embodiments of the present disclosure provide for the calibration of the antenna array 105 at the receiving terminal 100 while simultaneously receiving signals from the transmitting terminals 50. As described in more detail below, the calibration techniques described herein are used to calibrate the receive chains 125 over which data signals transmitted by the transmitting terminals 50 are received. A training signal for calibrating the antenna array is injected into a data signal received on each receive path to generate combined signals on each receive path. The combined signals are equalized by respective equalizers. The coefficients of the equalizers are determined by comparing a feedback signal for each receive path with the equalized signal to estimate the impairment on each receive path. The estimated impairment on each receive path is used to adapt the equalize coefficients for a respective equalizer to compensate for the impairment. After equalization, an estimate of the observed training signal on each receive path is subtracted from the equalized signal for the same receive path to generate estimates of the received data signals for demodulation and decoding.

The methods and apparatus described herein enable injection of high power AC training signals into weaker received data signals with minimal impact to user signal decodability. The methods and apparatus are particularly well suited to the injection of UL training signals for receive antenna calibration purposes when the calibration technique requires a high SINR for the training signals. Special scheduling slots where traffic is halted to do the calibration are not needed with the proposed method. It will therefore not impact system throughput.

Figure 2:
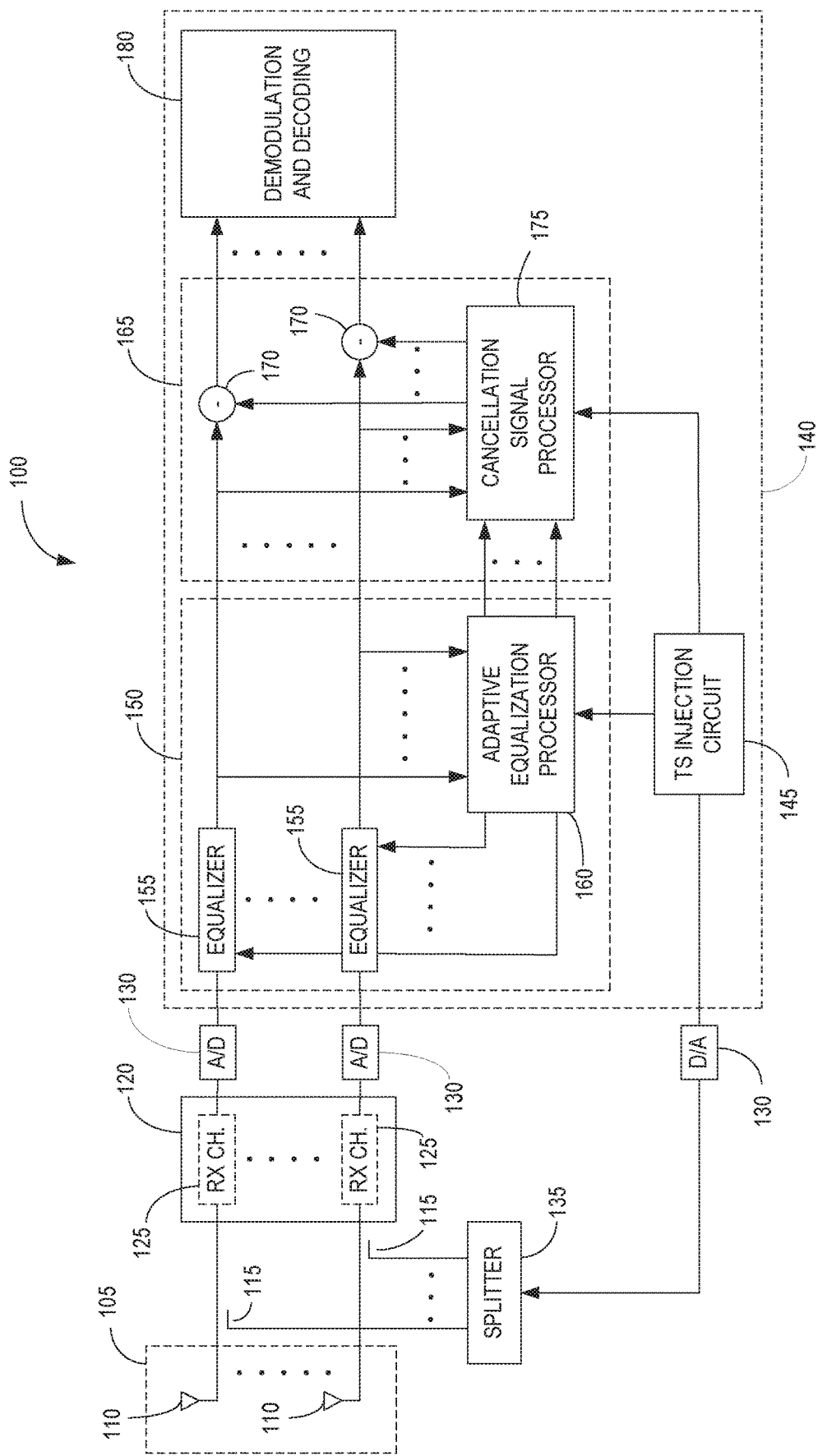
FIG. 2 is a functional block diagram of a receiving terminal according to one embodiment showing components involved in antenna calibration and training signal cancellation.

FIG. 2 is a functional block diagram illustrating the main functional components of a receiving terminal 100 according to one embodiment. The receiving terminal 100 generally comprises an antenna array 105, front end circuit 120, analog-to-digital converters (A/D) 130, and baseband processing circuit 140. The antenna array 105 comprises one or more antenna elements or subarrays 110 which are coupled to the front end circuit 120. The front end circuit 120 comprises a plurality of receive chains 125 which are coupled to respective antenna elements/subarrays 110. Each receive chain 125 comprises mixers, filters, and amplifiers for downconverting, filtering and amplifying the received data signal. Each receive chain 125 corresponds to a receive path. As used herein, "receive path" refers to a signal path traversed by a received data signal as it travels from a respective antenna element/subarray 110 through the front end circuit 120. There is a one to one correspondence between receive chains 125 and receive paths. The A/D converters sample and digitalize the received data signals to create digital baseband signals suitable for input to the baseband processing circuit 140.

The baseband processing circuit 140 comprises a processing circuit including a training signal (TS) injection circuit 145, an equalization circuit 150, a cancellation circuit 165, and a demodulation and decoding circuit 180. The TS injection circuit 145 generates a training signal for calibrating the antenna array 105. After D/A conversion and other signal operations (such as frequency mixing, filtering, amplification etc.), a splitter 135 generates multiple copies of the training signal and couplers 115 inject the training signal into respective receive paths. In one embodiment, the training signals injected into the receive paths are the same. In other embodiments, the training signals injected into different receive paths may differ.

The training signals combine with the received data signals on each receive path to generate a combined signal that passes through corresponding receive chains 125. The receive chain 125 introduces phase and amplitude distortions into the combined signal. The signal path of the training signal to the point of injection, referred to herein as the transmit path, also introduces distortions into the training signal.

The combined signal passing through each receive chain 125 is input to the equalization circuit 150. The equalization circuit 150 comprises a plurality of equalizers 155, one for each receive chain 125. The purpose of the equalizers 155 is to compensate for the impairments of the combined signals attributable to the imperfections in the receive chains 125. The equalizers 155 may, for example, comprise Finite Impulse Response (FIR) filters with one or more equalizer taps. The equalizers 155 reduce the distortions in the combined signal and output equalized signals. The equalized signals output by the equalizers 155 are a composite of the equalized data signals and the equalized training signals, referred to hereinafter as the observed training signals.

The adaptive equalization processor 160 estimates the impairment attributable to each receive chain 125 and generates equalizer coefficients for the equalizer taps in each equalizer 155. To estimate the impairment for each receive path, the adaptive equalization processor 160 compares the equalized signal output from each equalizer 155 to a reference signal. In one embodiment, the adaptive equalization processor 160 treats the received data signal as noise and the reference signal comprises the actual training signal injected into the received data signals. That is, the equalized signals are treated as approximations of the observed training signals with added noise. In this case, the adaptive equalization processor 160 compares the equalized signals output by each equalizer 155 with the actual training signal to generate signal path transfer functions representing the impairments in the observed training signals due to transmit path of the training signal and the receive path of the received data signals. The signal power of the training signal should therefore be at a level to obtain an adequate SNR to enable accurate estimation of the signal path transfer functions. The adaptive equalization processor 160 uses the estimate of the signal path transfer functions to generate new equalizer coefficients for the equalizers 155. The equalizer coefficients for the equalizers 155 determine the impulse responses of the equalizers 155, which are the approximate inverse of the estimated signal path transfer functions representing the impairment in the observed training signals.

The equalized signal output from each equalizer 155 is input to the cancellation circuit 165, whose function is to subtract the observed training signals from the equalized signals to obtain useable estimates of the received data signals. The cancellation circuit 165 comprises a plurality of subtracting units 170 and a cancellation signal processor 175. The cancellation signal processor 175 generates cancellation signals, which are estimates of the observed training signals contained in the equalized signals. The subtracting units 170 subtract the cancellation signals from respective ones of the equalized signals to obtain estimates of the received data signals. Due to noise and estimation errors, the observed training signals will contain minor impairments not removed by the equalization circuit 150 so that the estimates of the received data signals will be slightly impaired by the residual training signal left after subtracting the cancellation signals. The residual impairment in the estimates of the received data signals output by the subtracting units 170 should have only minor impact on the demodulation and decoding of the receive signals.

Normally the training signals are added into the receive paths only periodically. Similarly, the adaptive processing to update the equalizer coefficients is only performed when the training signal is present. The period of this correction is based on the expected time for the path error to grow to within some acceptable upper-bound. The adaptive equalization processor 160 will continue to keep up with changes in the impulse response of the receive paths over time, which can change due to aging, temperature changes, etc., even when calibration is not being performed.

The receiving terminal 100 with training signal cancellation allows the reception of data signals from transmitting terminals 50 while simultaneously performing antenna calibration. The residual impairment of the data signals due to the injection of the training signal may have a minor impact on decoding and demodulation. The additional impairment due to the injection of the training signals can be compensated for by changing the data rate and/or MCS used during the calibration period when AC is being performed. While there may be some degradation in throughput, useful data signals for demodulating and decoding can be obtained, which will increase system capacity and throughput.

Figure 3:
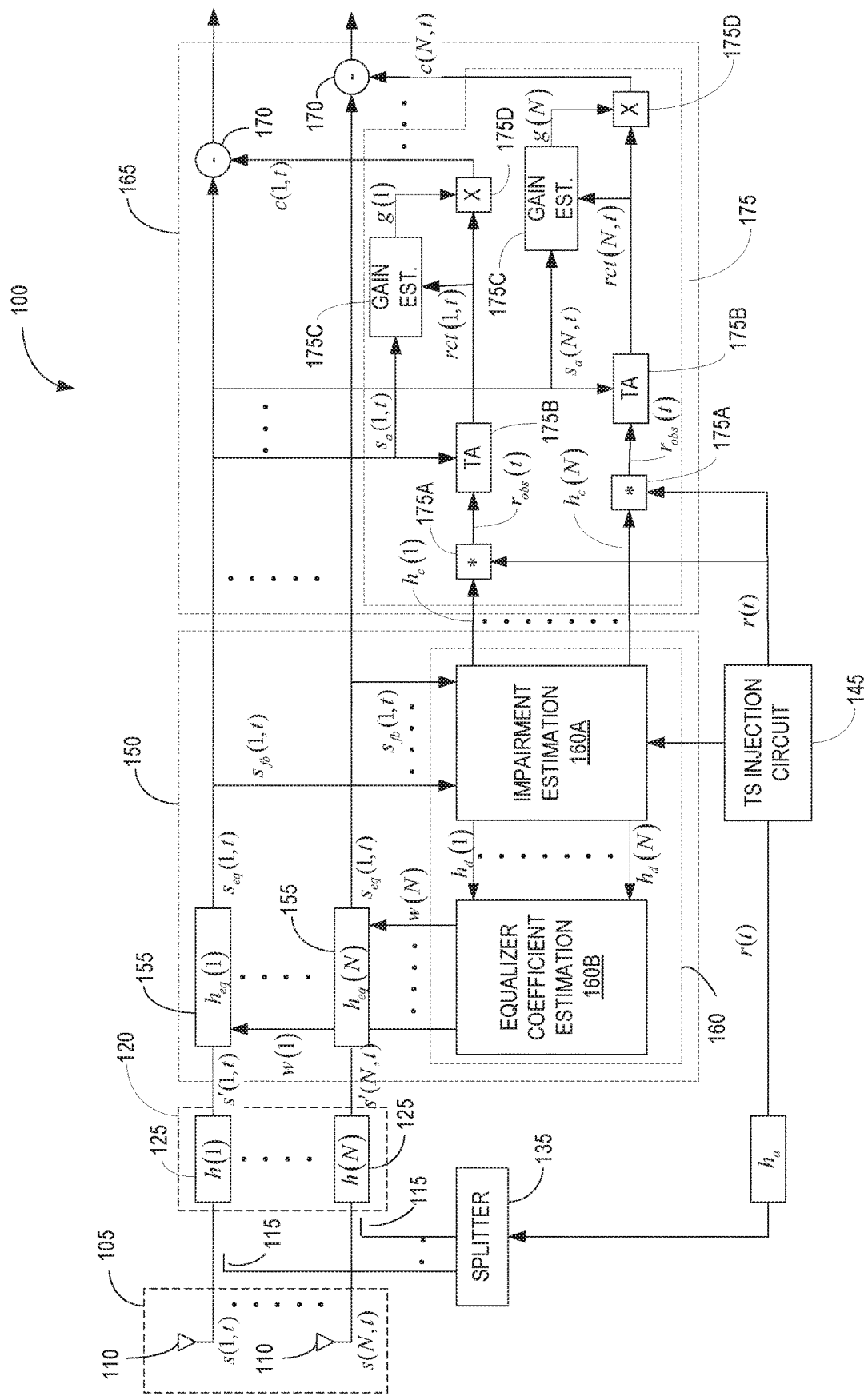
FIG. 3 illustrates signal processing for antenna calibration and cancellation of training signals in a receiving terminal, according to an embodiment.

FIG. 3 illustrates signal processing performed by the receiving terminal 100 in more detail. For convenience similar reference numbers are used in FIGS. 2 and 3 to indicate similar components.

The signal received by the ith antenna element/sub-array 110 at time t is denoted s(i,t). The training signal r(t) output by the TS injection circuit 145 is injected into the received data signal s(i,t) on each receive path after passing through a transmit chain with transfer function $h_a$, which includes distortion attributable to the splitter 135. The transfer function $h_a$ is common for all receive paths. The combined signals are distorted by the receive chains 125 with respective signal path transfer functions h(i). The combined signals s'(t) at the input of each equalizer 155 are given by:

$$s'(i,t)=s(i,t)*h(i)+r(t)*h(i)*h_a+n(i) \qquad \text{Eq. (1)}$$

where * is a time convolution. The impulse responses of the equalizers 155 for each receive path are denoted by $h_{eq}(i)$. The equalized signal $s_{eq}(i,t)$ at the output of each equalizer 155 is given by:

$$s_{eq}(i,t)=s(i,t)*h_{eq}(i)*h(i)+r(t)*h_{eq}(i)*h_a+n(i) \qquad \text{Eq. (2)}$$

The term $s(i,t)*h_{eq}(i)*h(i)$ in Eq. 2 is the equalized data signal and the term $r(t)*h_{eq}(i)*h(i)*h_a$ is the equalized training signal, referred to hereinafter as the observed training signal.

In the embodiments show in FIGS. 2 and 3, the equalized signals $s_{eq}(i,t)$ output by each equalizer 155 are used as feedback signals by the adaptive equalization processor 160. For each receive path i, the adaptive equalization processor 160 compares the individual feedback signal $s_{fb}(i,t)=s_{eq}(i,t)$ for that receive path with the actual training signal r(t) to estimate the signal path transfer function $h_d(i)$ given by:

$$h_d(i)=h_{eq}(i)*h(i)*h_a. \qquad \text{Eq. (3)}$$

The signal path transfer function $h_d(i)$ represents the impairment to the observed training signal in the feedback signal caused by the transmit chain for the training signal and a respective receive chain. The estimation of the signal path transfer function $h_d(i)$ is performed by an impairment estimation function 160A in the adaptive equalization processor 160.

In other embodiments, the adaptive equalization processor 160 may use the input signals s'(i,t) for each equalizer 155 given in Eq. (1) as the feedback signals so that $s_{fb}(i,t)$ =s'(i,t).

The signal path transfer function $h_d(i)$ for each receive path comprises a convolution of the transmit path transfer function $h_a$, the receive path transfer function h(i), and the impulse response $h_{eq}(i)$ of the equalizer 155. The data signal $s(i,t)*h_{eq}(i)*h(i)$ in Eq. (2) is treated as noise by the adaptive equalization processor 160 and is grouped in with n(i) to form total noise $n_d(i)=s(i,t)*h_{eq}(i)*h(i)+n_t$. Thus, Eq. (2) can be rewritten as:

$$s_{eq}(i,t)=s_{fb}(i,t)=r(t)*h_d(i)+n_d(i) \qquad \text{Eq. (4)}$$

where $r(t)*h_d$ is the observed training signal.

The signal r(t) should have a high enough signal to noise ratio (SNR) compared to $n_d(i)$ to solve for $h_d(i)$. Therefore, r(t) should be injected at a similar or higher level than s(i,t). The amount of averaging needed to derive an accurate estimate of the signal path transfer function $h_d(i)$ is a function of the SNR of the observe training signal in the equalized signal $s_{eq}(i,t)$.

To solve $h_d(i)$, the feedback signal $s_{fb}(i,t)$ and training signal r(t) are initially time aligned. After time alignment, the signal path transfer function $h_d(i)$ is determined in the frequency domain according to:

$$H_d(i,k) = \frac{FFT(s_{fb}(i,t))}{FFT(r(t))} = \frac{S_{fb}(i,k)}{R(k)} \quad \text{Eq. (5)}$$

where k is the frequency bin index. The noise $n_d(i)$ will reduce the transfer function estimation accuracy. To improve the transfer function estimation accuracy in the presence of noise, the estimation process can be repeated multiple times and the transfer functions $H_d(i,k)$ averaged in the frequency domain.

The required equalizer transfer function $H_{eq}(i)$ for calibration in the frequency domain is either the inverse of $H_d(i,k)$ for absolute calibration, or the inverse of $H_d(i,k)/H_d^{AVG}(i,k)$, for relative calibration, where $H_d^{AVG}(i,k)$ is the average of $H_d(i,k)$ over the same frequency bin for two or more, and preferably all, receive paths. Generation of the equalizer coefficients is performed by an equalizer coefficient estimation function 160B in the adaptive equalization processor 160. U.S. Pat. No. 9,904,254 (the '254 patent) describes the equalizer processing, including the equalizer synthesis to get the time domain equalizer transfer function $h_{eq}(i)$ equalizer coefficients w(i) of the equalizer 155. The '254 patent is incorporated herein in its entirety by reference.

The frequency domain response of the signal path transfer function that will be used for the signal cancellation is:

$$H_c(i,k) = \frac{H_d(i,k)}{\Delta H_{eq}(i,k)} \quad \text{Eq. (6)}$$

where $\Delta H_{eq}(i,k)$ is the difference between the previous equalizer transfer function $h_{eq\_prev}(i)$ determined in a previous calibration period, and the equalizer transfer function $h_{eq\_prev}(i)$ determined in the current calibration period. The difference $\Delta H_{eq}(i,k)$ is given by:

$$\Delta H_{eq}(i,k) = \frac{H_{eq\_current}(i,k)}{H_{eq\_prev}(i,k)} \quad \text{Eq. (7)}$$

If the feedback signals into the adaptive equalization processor 160 comprise the combined signals s'(i,t) before equalization, then $\Delta H_{eq}(i,k)=1$. The time domain response for each receive path is then determined by doing an inverse frequency transform to obtain a transfer function $h_c(i)$ for each receive path given by:

$$h_c(i)=ifft(H_c(i,k)) \quad \text{Eq. (8)}$$

The estimation of the signal path transfer function $h_c(i)$ used for generating the cancellation signal is performed by the impairment estimation function 160A in the adaptive equalization processor 160.

The signal path transfer functions $h_c(i)$ is input to the cancellation signal processor 175 and is used to generate cancellation signals c(i,t). The cancellation signal processor 175 includes, for each receive path, a convolving function 175A, a time alignment function 175B, a gain estimation function 175C, and a multiplying function 175D. The signal path transfer function $h_c(i)$ for each receive path is convolved with the training signal r(t) by the convolving function 175A to obtain estimates $r_{obs}(t)$ of the observed training signals in the equalizer signals $s_{eq}(1,t)$.

In some embodiments, the training signal r(t) can be converted to the frequency domain to obtain R(k), which can be multiplied with the signal path transfer function $H_c(i,k)$ in the frequency domain to obtain $R_{obs}(k)$. The observed training signal $r_{obs}(t)$ in the time domain can be then be obtained by performing an IFFT on $R_{obs}(k)$.

The estimates $r_{obs}(t)$ of the observed training signals are time aligned with respective equalized signals $s_{eq}(i,t)$ by the time alignment functions 175B and multiplied by a complex gain g(i) by the multiplying function 175D to generate cancellation signals $c(i,t)=r_{obs}(t)*g(i)$. The cancellation signals c(i,t) are subtracted from respective equalized signals $s_{eq}(i,t)$ to remove the effect of the observed training signals from the equalized signals $s_{eq}(i,t)$.

The gain g(i) is determined in an adaptive loop which minimizes the receive power. The gain g(i) is determined by the gain estimation function 175C. To determine the gain g(i), a sampled block $s_a(i,1,\ldots,L)$ with length L of the equalized signal is used together with the corresponding block rct(i,1,...,L) of length L of the time aligned observed training signal to minimize the power p given by:

$$p=abs(s_a(i,l,\ldots,L)-g(i)rct(i,l,\ldots,L))^2 \quad \text{Eq. (9)}$$

The gain g(i) may be determined using a steepest descent, least squares (LS) or least mean squares (LMS) algorithm.

In an alternate embodiment of the disclosure, the adaptive equalization processor 160 may use the input signals s'(i,t) for each equalizer 155 given in Eq. (1) as the feedback signals so that $s_{fb}(i,t)=s'(i,t)$. In this case, the observed training signal $r_{obs}(t)$ is given by $r(t)*h(i)*h_a$ and the adaptive equalization processor 160 estimates the signal path transfer function $h_d(i)=h(i)*h_a$ according to Eq. 5. Also, in this case, the cancellation signal c(i,t) for each receive path can be generated and subtracted from s'(i,t) prior to equalization. The cancellation signal can be generated by convolving the actual training signal r(t) with $h_d(i)$ and multiplying the result by g(i). In this case, a sampled block $s_a(i,1,\ldots,L)$ with length L of the combined signal s'(i,t) is used together with a corresponding block rct (i,1,...,L) of length L of the time aligned observed training signal is used to generate the gain g(i).

Figure 4:
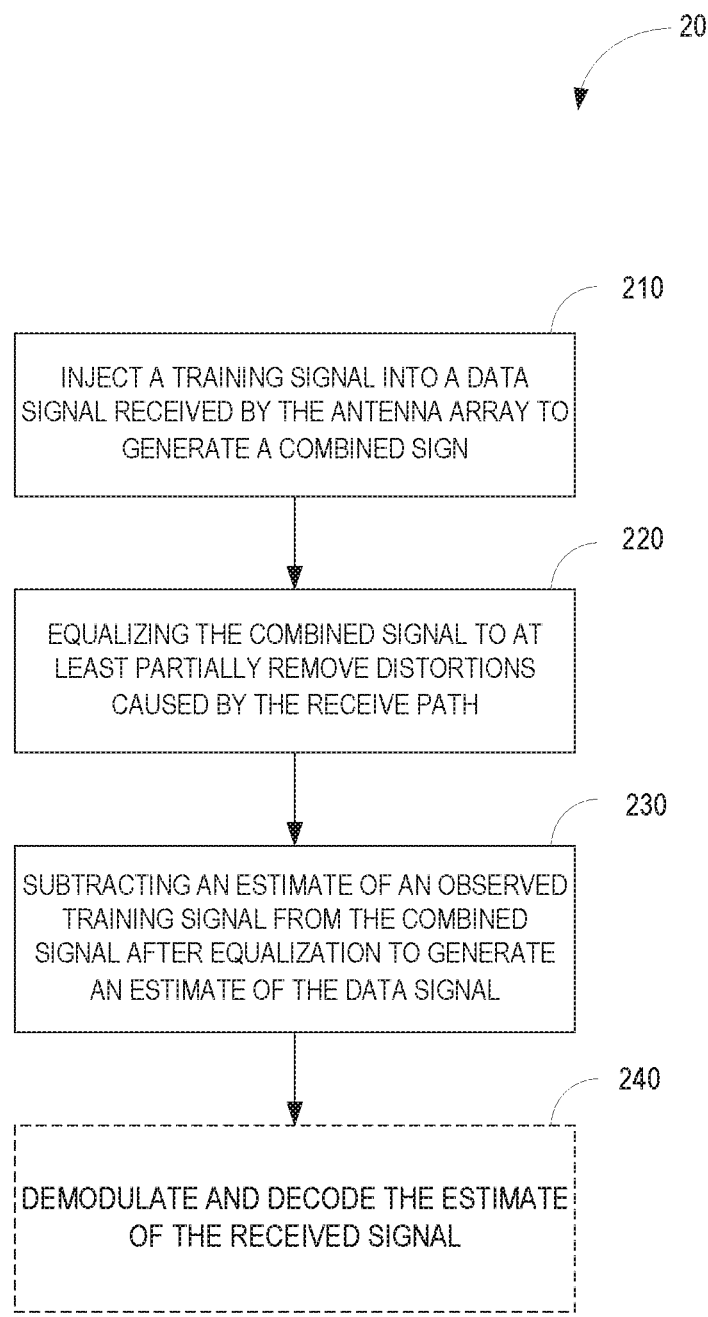
FIG. 4 illustrates an exemplary method of antenna calibration and training signal cancellation implemented by a receiving terminal, according to an embodiment.

Referring to FIG. 4, an exemplary method 200 implemented by a receiving terminal 100 for calibrating the antenna array 105 is shown. The method 200 is performed for each of one or more receive paths/receive chains. The receiving terminal 100 injects a training signal r(t) into a data signal s(i,t) received by the antenna array 105 to generate a combined signal s'(i,t) (block 210). In some embodiments, the same training signal r(t) is injected into each receive path. In other embodiments, different training signals may be injected into different receive paths. The receiving terminal 100 equalizes the combined signal s'(i,t) on each receive path to at least partially remove the distortions caused by the receive path (block 220). Generally, equalization is performed by applying an equalizer transfer function $h_{eq}(i)$ to the combined signal s'(i,t) received on the receive path to obtain an equalized signal $s_{eq}(i,t)$. Following equalization, the receiving terminal 100 subtracts an estimate of an observed training signal from the equalized signal $s_{eq}(i,t)$ to generate an estimate $s_{est}(i,t)$ of the received signal (block 230). Those skilled in the art will appreciate that equalization will not remove the impairment to the observed training signal completely so that the observed training signal will comprise an impaired version of the actual training signal. The estimate $s_{est}(i,t)$ of the data signal may be input to a demodulation and decoding unit 180 for demodulation and decoding (block 240). One aspect of the disclosure is to make the receive path frequency responses for the different receive paths, including the equalizer, similar. Making them all have the average frequency response allows the minimum equalizer change per branch. This also serves the purpose of not including any training signal transmitter impairments as this will be common to the average response. The residual impairment is handled in baseband as part of the demodulation and decoding process.

In some embodiments of the method 200, equalizing the combined signal $s'(i,t)$ comprises, for each receive path, generating equalizer coefficients $w(i)$ to compensate the combined signal $s'(i,t)$ for distortions caused by the receive path, and applying the equalizer coefficients $w(i)$ to the combined signal $s'(i,t)$. In some embodiments, the equalizer coefficients $w(i)$ are generated by comparing a feedback signal $s_{fb}(i,t)$ to the training signal. The feedback signal $s_{fb}(i,t)$ may comprise the combined signal $s'(i,t)$ prior to equalization, or the equalized signal $s_{eq}(i,t)$ output by the equalizer.

In some embodiments of the method 200, generating the equalizer coefficients $w(i)$ comprises deconvolving the feedback signal $s_{fb}(i,t)$ and the training signal in a frequency domain to obtain a first signal path transfer function $h_d(i,t)$ representing impairment of the training signal in a current calibration period, and generating the equalizer coefficients $w(i)$ based on the first signal path transfer function $h_d(i,t)$. In one embodiment, the receiving terminal 100 generates an average transfer function $h_d^{AVG}(t)$ representing an average impairment of the training signal across two or more receive paths in the current calibration period, and generates the equalizer coefficients $w(i)$ based on a comparison of the first transfer function $h_d(i,t)$ and the average signal path transfer function $h_d^{AVG}(t)$ for two or more paths. In one embodiment, the equalizer coefficients $w(i)$ are computed based on the inverse of the first signal path transfer function $h_d(i,t)$ representing impairment to the training signal due to the receive path and an average signal path transfer function $h_d^{AVG}(t)$ representing an average impairment of the training signal across two or more receive paths.

Some embodiments of the method 200 further comprises time aligning the observed training signal with the feedback signal prior to the subtracting.

In some embodiments, method 200 further comprises generating the estimate of the observed training signal. For example, the receiving terminal 100 in one embodiment generates a first signal path transfer function $h_d(i)$ representing impairment of the observed training signal in a current calibration period, and generates the estimate of the observed training signal based on the first signal path transfer function $h_d(i)$. In one embodiment, the receiving terminal 100 generates the estimate of the observed training signal by computing a difference between an equalizer transfer function $h_{eq}(i)$ in the current calibration period and the equalizer transfer function $h_{eq}(i)$ in a previous calibration period prior to the current calibration period, generating a second signal path transfer function $h_c(i)$ representing impairment in the observed training signal in the previous calibration period based on the first signal path transfer function $h_d(i)$ and the difference in the equalizer transfer function $\Delta h_{eq}(i)$ between the current and previous calibration periods; and generating the observed training signal based on the second transfer function $h_c(i)$.

In some embodiments, the method 200 further comprises demodulating and decoding the estimate $s_{est}(i,t)$ of the data signal on one or more receive paths.

Figure 5:
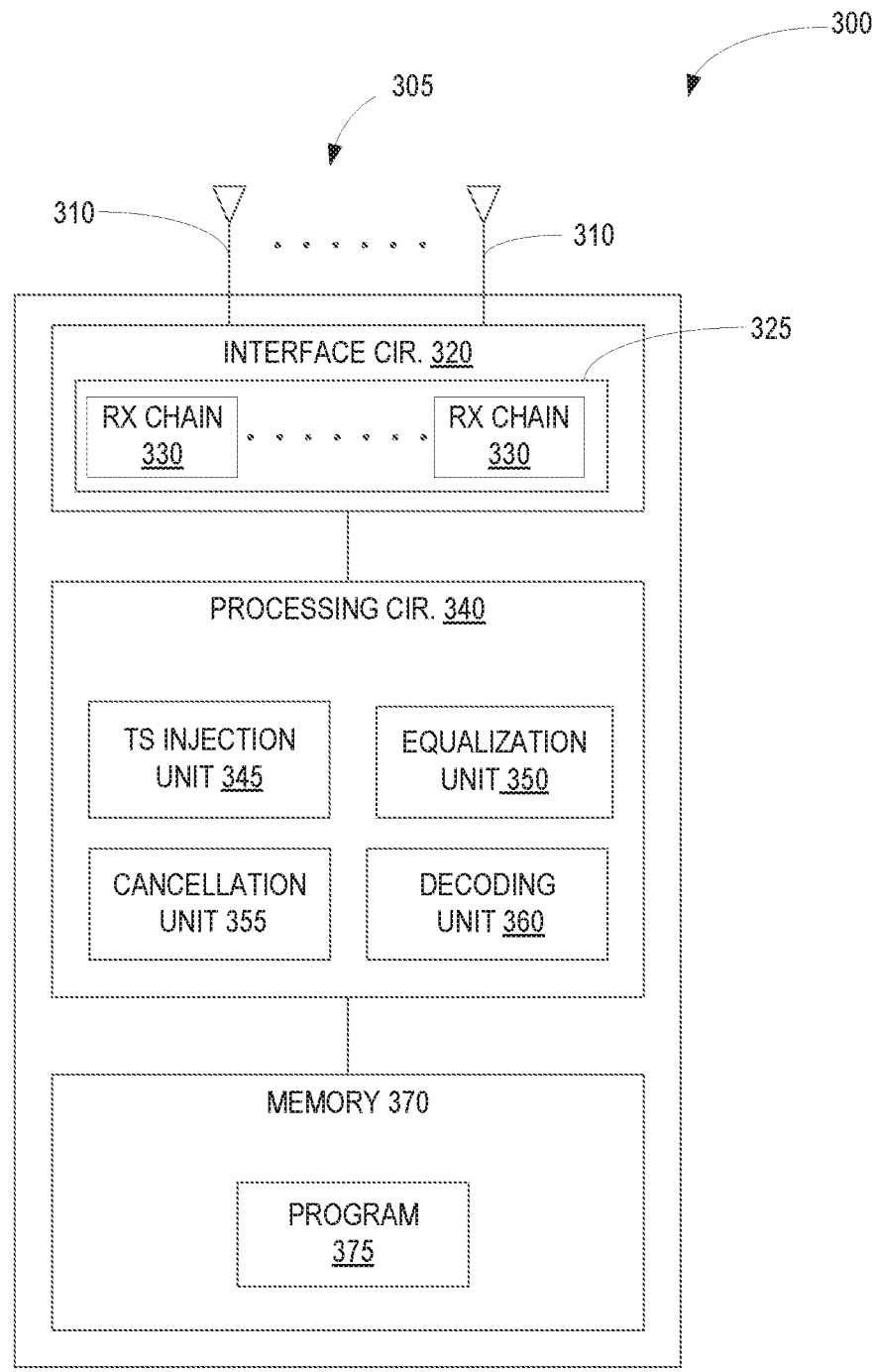
FIG. 5 is a block diagram of a receiving terminal according to another embodiment of the disclosure.

FIG. 5 illustrates a receiving terminal 300 according to one embodiment. The receiving terminal 300 comprises an antenna array 305 having multiple antenna elements or subarrays 310, an interface circuit 320, processing circuit 340, and memory 350.

The interface circuit 320 is coupled to the antenna array 305 and comprises the radio frequency (RF) components needed for transmitting and receiving wireless communication channel 20. The interface circuit 320 includes a front end circuit 325 having multiple receive chains 330 coupled to respective antenna elements/subarrays 310.

The processing circuit 340 processes the signals transmitted to or received by the receiving terminal 300. Such processing includes coding and modulation of transmitted signals, and the demodulation and decoding of data signals. The processing circuit 340 includes a TS injection unit 345 for generating training signals used for AC, an equalization unit 350 for equalizing combined signals as herein described, and a cancellation unit 355 to cancel the training signal from the equalized signals as described herein. The processing circuit 340 may also optionally include a demodulation and decoding unit 360 for demodulating and decoding estimates of the data signals after the training signal is removed. The processing circuit 340 may comprise one or more microprocessors, hardware, firmware, or a combination thereof. In one embodiment, the TS generation unit 345, equalization unit 350, cancellation unit 355, and demodulation and decoding unit 360 are implemented by a single microprocessor. In other embodiments, the TS generation unit 345, equalization unit 350, cancellation unit 355, and demodulation and decoding unit 36 are implemented using different microprocessors.

Memory 370 comprises both volatile and non-volatile memory for storing computer program code and data needed by the processing circuit 340 for operation. Memory 370 may comprise any tangible, non-transitory computer-readable storage medium for storing data including electronic, magnetic, optical, electromagnetic, or semiconductor data storage. Memory 370 stores a computer program 375 comprising executable instructions that configure the processing circuit 340 to implement methods 200 according to FIG. 4 as described herein. In general, computer program instructions and configuration information are stored in a non-volatile memory, such as a read only memory (ROM), erasable programmable read only memory (EPROM) or flash memory. Temporary data generated during operation may be stored in a volatile memory, such as a random access memory (RAM). In some embodiments, computer program 375 for configuring the processing circuit 340 as herein described may be stored in a removable memory, such as a portable compact disc, portable digital video disc, or other removable media. The computer program 375 may also be embodied in a carrier such as an electronic signal, optical signal, radio signal, or computer readable storage medium.

Figure 6:
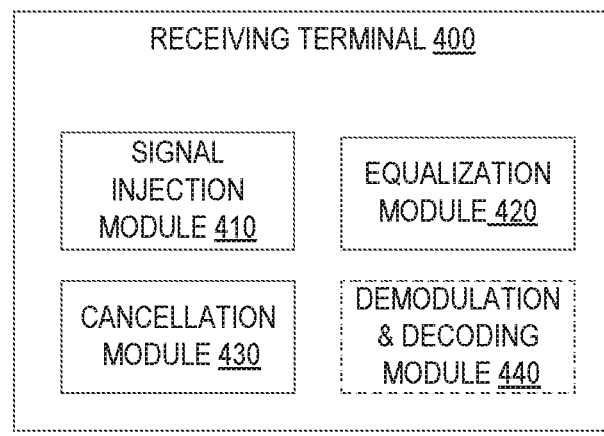
FIG. 6 is a block diagram of a receiving terminal according to another embodiment of the disclosure.

FIG. 6 illustrates a receiving terminal 400 device 12 in accordance with one or more other embodiments. As shown In FIG. 6, the receiving terminal 400 comprises a TS injection module 410, equalization module 420, cancellation module 430, and optionally a demodulation and decoding module 440. The various modules 410, 420, 430, and 440 can be implemented by hardware and/or by software code that is executed by a processor or processing circuit. The TS injection module 410 injects a training signal into data signals received by an antenna array (not shown) connected to two or more receive paths to generate a combined signal on each receive path. The equalization module 420 equalizes the combined signal on each receive path to at least partially remove distortions caused by the receive path. The cancellation module 430 subtracts an estimate of observed training signal on each receive path from the combined signal after equalization to generate an estimate of the received data signal. The demodulation and decoding module 440 demodulates and decodes the estimates of the received data signals output by the cancellation module 430.

What is claimed is:

1. A method, implemented in a receiving terminal, of calibrating an antenna array connected to multiple receive paths, the method comprising the receiving terminal, for each of two or more receive paths:
   injecting a training signal into a data signal received on the receive path to generate a combined signal;
   equalizing the combined signal to generate an equalized signal with reduced distortion, wherein the equalizer compensates for impairments of the combined signal attributable to the receive path; and
   subtracting an estimate of an observed training signal from the equalized signal to generate an estimate of the data signal.

2. The method of claim 1, wherein the equalizing the combined signal to generate the equalized signal comprises:
   generating equalizer coefficients to compensate the combined signal for distortions caused by the receive path; and
   applying the equalizer coefficients to the combined signal to at least partially remove the distortions due to the receive path.

3. The method of claim 2, wherein the generating equalizer coefficients comprises generating the equalizer coefficients based on a comparison of a feedback signal to the training signal.

4. The method of claim 3, wherein the generating equalizer coefficients based on the comparison of the feedback signal to the training signal comprises:
   deconvolving the feedback signal and the training signal in a frequency domain to obtain a first signal path transfer function representing impairment in the observed training signal in a current calibration period; and
   generating the equalizer coefficients based on the first signal path transfer function.

5. The method of claim 4, wherein the generating equalizer coefficients based on the first signal path transfer function comprises:
   generating an average transfer function representing an average impairment of observed training signals on two or more receive paths; and
   generating the equalizer coefficients based on a comparison of the first signal path transfer function and the average transfer function.

6. The method of claim 1, further comprising generating the estimate of the observed training signal.

7. The method of claim 6, wherein the generating the estimate of the observed training signal comprises:
   generating a first signal path transfer function representing impairment in the observed training signal in a current calibration period; and
   generating the estimate of the observed training signal based on the first signal path transfer function.

8. The method of claim 7, wherein the generating the estimate of the observed training signal based on the first signal path transfer function comprises:
   computing a difference between an equalizer transfer function in the current calibration period and an equalizer transfer function in a previous calibration period prior to the current calibration period;
   generating a second signal path transfer function representing impairment in the observed training signal in the previous calibration period based on the first signal path transfer function and the difference in the equalizer transfer function between the current and previous calibration periods; and
   generating the observed training signal based on the second signal path transfer function.

9. The method of claim 8, wherein generating the observed training signal based on the second signal path transfer function comprises convolving the training signal with the second signal path transfer function.

10. The method of claim 1, further comprising demodulating and decoding the estimates of the data signals for two or more receive paths.

11. The method of claim 2, wherein the injecting the training signal into the data signal comprises injecting the training signal at a power level to obtain a signal-to-noise ratio sufficient for generating the equalizer coefficients.

12. The method of claim 11, wherein an amount of averaging for generating the equalizer coefficients depends on the signal-to-noise ratio.

13. A receiving terminal in a wireless communication network, the receiving terminal comprising:
   an antenna array;
   a front end circuit coupled to the antenna array for receiving signals over a wireless communication channel, the front end circuit having multiple receive paths; and
   a processing circuit configured to, for each of two or more receive paths:
      inject a training signal into a data signal received on the receive path to generate a combined signal;
      equalize the combined signal to generate an equalized signal with reduced distortion, wherein the equalizing compensates for impairments of the combined signal attributable to the receive path; and
      subtract an estimate of an observed training signal from the equalized signal to generate an estimate of the data signal.

14. The receiving terminal of claim 13, wherein the processing circuit is further configured to:
   generate equalizer coefficients to compensate the combined signal for distortions caused by the receive path; and
   apply the equalizer coefficients to the combined signal to at least partially remove the distortions due to the receive path.

15. The receiving terminal of claim 14, wherein the processing circuit is further configured to generate the equalizer coefficients based on a comparison of a feedback signal to the training signal.

16. The receiving terminal of claim 15, wherein the processing circuit is further configured to:
   deconvolve the feedback signal and the training signal in a frequency domain to obtain a first signal path signal path transfer function representing impairment in the observed training signal in a current calibration period; and generate the equalizer coefficients based on the first signal path transfer function.

17. The receiving terminal of claim 16, wherein the processing circuit is further configured to:
generate an average signal path transfer function representing an average impairment of observed training signals on two or more receive paths;
generate the equalizer coefficients based on a comparison of the first signal path transfer function and the average signal path transfer function.

18. The receiving terminal of claim 13, wherein the processing circuit is further configured to time align the observed training signal with the feedback signal prior to the subtracting.

19. The receiving terminal of claim 13, wherein the processing circuit is further configured to generate the estimate of the observed training signal.

20. A non-transitory computer-readable storage medium containing a computer program comprising executable instructions that, when executed by a processing circuit in a receiving terminal in a wireless communication network causes the receiving terminal to calibrate an antenna array connected to multiple receive paths by, for each of two or more receive paths:

injecting a training signal into a data signal received on the receive path to generate a combined signal;

equalizing the combined signal to generate an equalized signal with reduced distortion, wherein the equalizing compensates for impairments of the combined signal attributable to the receive path; and subtracting an estimate of an observed training signal from the equalized signal to generate an estimate of the data signal.

* * * * *